W. A. KITTS, Jr.
BLOW-OFF VALVE.
APPLICATION FILED JULY 23, 1919.
1,437,426.
Patented Dec. 5, 1922.
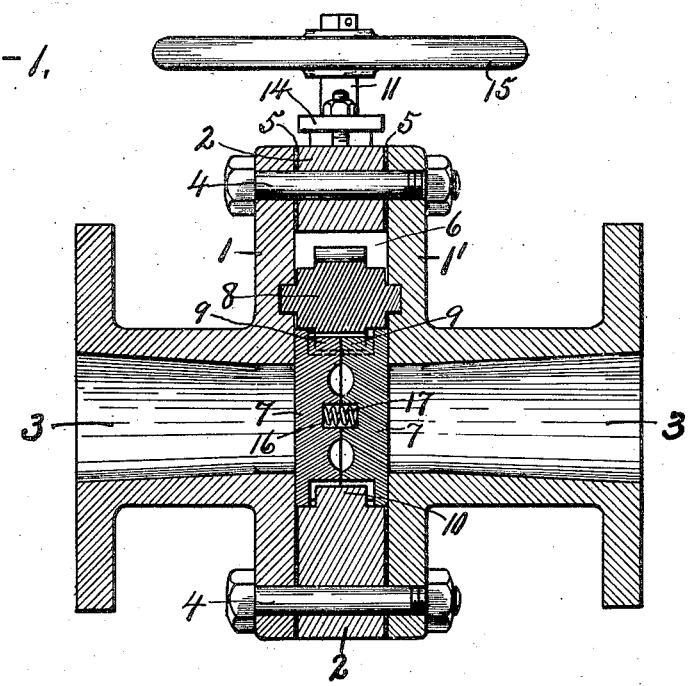
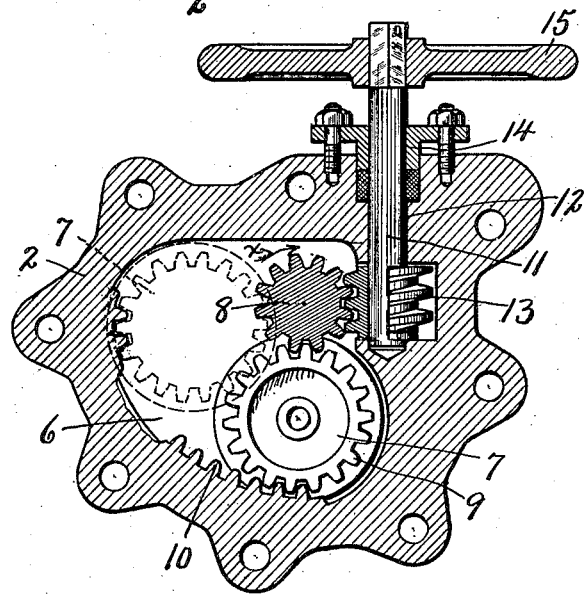

Patented Dec. 5, 1922.

1,437,426

UNITED STATES PATENT OFFICE.

WILLARD A. KITTS, JR., OF MOUNTAIN LAKES, NEW JERSEY.

BLOW-OFF VALVE.

Application filed July 23, 1919. Serial No. 312,874.

*To all whom it may concern:*

Be it known that I, WILLARD A. KITTS, Jr., of Mountain Lakes, in the State of New Jersey, have invented new and useful Improvements in Blow-Off Valves, of which the following, taken in connection with the accompanying drawings, is a full, clear, and exact description.

This invention relates to certain improvements in blow off valves for steam boilers and other containers for fluid under greater or less pressure, and which needs to be wholly or partially blown off occasionally to remove sediment and other foreign matter which may accumulate therein.

The main object is to provide a simple and efficient disk valve preferably composed of similar and interchangable sections held against the opposed seats around the outlet port so that it may be reversed and used either side to the boiler pressure without liability of leakage when closed.

Another object is to provide means whereby the valve disks may be opened and closed across the outlet port with combined rolling and sliding motion and positively held in any position of adjustment by its operating means.

Further object is to enable the valve disks to be adjusted rotarily relatively to each other and their respective seats, so as to distribute the wear of said disk circumferentially throughout the area of the bearing surfaces.

Other objects and uses relating to the specific parts of the device will be brought out in the following description.

In the drawings Figure —1— is the longitudinal and vertical sectional angle view of a blow off valve embodying the various features of my invention. Figure —2— is a central transverse vertical sectional view of the same device.

As illustrated this blow off valve comprises a pair of similar co-axial bearing rings 1 and 1', arranged in axially spaced relation for receiving between their adjacent ends a hollow spacing member —2—, and are provided with axially aligned ports —3—, either of which may be connected to the outlet of the boiler by securing the corresponding ring to said boiler in any suitable manner not necessary to herein illustrate or describe.

The rings 1 and 1' and spacing member —2— are secured together end to end by suitable clamping means as bolts —4—, the joints between the meeting faces of said rings and spacing member to be filled with suitable packings —5— to prevent leakage.

The opening as —6— in the spacing member —2— is considerably larger than that of the ports —3— and is preferably eccentric thereto, for receiving a pair of opposed similar valve disks —7— and a pinion —8—.

These valve disks —7— are preferably circular and of the same diameter, greater than that of the ports —3—, so as to entirely cover the latter when closed and at the same time to form a sufficient bearing to overlap upon the adjacent faces of the rings 1 and 1' to guide the valves in their opening and closing movements. The inner adjacent ends of the disks —7— are reduced in diameter and are provided with circumferential gear teeth —9—, meshing with a pinion —8— and also with a tooth rack —10— on the inner faces of the spacing member —2—, thereby forming peripheral bearings at the outer ends of the gear teeth for rolling engagement with similar peripheral bearings on the pinion —8— and with tracks on the ring —2— concentric with the axis of the pinion, as shown more clearly in Fig. 1. The valve and gear thereon are, therefore, held by and between the pinion —8— and rack —10— with its peripheral bearings in rolling contact with both those members, so that when the pinion —8— is rotated in one direction, its annular bearings at the ends of the teeth engaging the annular bearings of the valve will cause the valve to roll along the tracks on the ring —2— at opposite sides of the tooth rack —10—, while the gear teeth of the pinion —8—, valve disks —7— and ring —2— assure a positive rolling motion of the valve along the track as the pinion is rotated.

The rack —10— is concentric with the axis of the pinion —8— and is of sufficient length to permit the disks —7— to roll from a position across the ports —3— to a position wholly or mainly to one side thereof for closing and opening the said ports, it being understood that both disks are imperforate, so as to completely close communication between the ports —3— when closed.

The means for rotating the pinion —8— to shift the disks —7— to and from their closed positions comprises in this instance a shaft or spindle —11— journaled in an opening —12— in the spacing member —2— substantially tangential to the pinion —8— and having its inner end provided with a worm —13— meshing with said pinion, the outer end of the said shaft or spindle being journaled in a suitable gland —14— and provided with hand wheel —15— by which the shaft or spindle with worm —13— thereon may be rotated in reverse directions.

The inner ends of the disks —7— are provided with co-axial sockets —16— for receiving a coil spring —17— which tends to force said disks apart and thereby to hold the outer ends of said disks against their respective seats on the rings 1 and 1'.

The valve disks —7— are shown in their closed positions by full lines in both of the figures and in their open positions by dotted lines in Figure —2—.

In order to open the valve the hand wheel —15— will be turned in such direction as to cause the pinion —8— to rotate in the direction indicated by arrow —x— Fig. —2— which by reason of its engagement with the teeth of disks —7— will cause said disks to roll from their closed position toward their open positions along the rack —10— which in conjunction with the pinion —8— and worm —13— will hold the disks in their adjusted positions.

By reversing the direction of movement of the hand wheel 15 the disks may be restored to their closed positions.

The opposite ends of the pinion —8— are preferably reduced in diameter as shown in Figure —1— and journaled in corresponding sockets —18— in the adjacent end face of the rings 1 and 1'. In assemblying the parts of the mechanism the disks —7— are placed together end to end with the spring properly seated in the sockets —16— and together with the pinion —8— are placed upon the inner face of one of the rings as —1— after which the spacing member —2— with the pinion operating means therein is placed in operative position upon the same ring, whereupon the other ring is then placed in operative position and firmly clamped by the bolts —4— to the spacing member. The bearing faces between the valve disks —7— and rings 1 and 1' are substantially flat and extend beyond the periphery of the gear teeth —9— so that when the valve is open to discharge fluid from the boiler or other container such fluid will not wear the teeth —9—.

Another advantage of this arrangement of the disks —7— between the bearing faces of the rings 1 and 1' is that the disks may be reversed end for end and either end exposed to the pressure side of the boiler, under which conditions the opposite disk will be forced by such pressure into engagement with its seat to prevent leakage, while the sprin  will tend to hold the other disk to its seat.

It will also be observed that when the rings are separated from the spacing member —2—, as by the removal of the bolts —4—, either or both of the disks may be removed and adjusted rotarily, to cause different portions thereof to ride against the seats on the rings 1 and 1', after the latter are re-assembled, thereby greatly increasing the life of the valve as a whole by utilizing all portions of its wearing surfaces.

The bearing rings 1 and 1' and the spacing member —2— constitute a valve case, either end of which may be secured to the boiler around the outlet so that in case the valve seat or adjacent end of the valve opposite the pressure side becomes worn, the case may be reversed to oppose the other side and adjacent end of the valve to the pressure side, thereby doubling the life of the valve mechanism as a whole, without reducing its working efficiency.

It is also evident that by making the bearing rings 1 and 1' separately and also by making the valve in two parts either of those parts may be replaced individually in case it becomes impaired without replacing the other parts.

It will be observed that the gear teeth of the pinion —8— disks —7— and spacing member —2— are all outside of the passage way formed by the ports —3—, and therefore are not exposed to wear incidental to a passage of fluid and foreign matter which may be discharged therewith through said passage way, all of which adds materially to the life of the valve mechanism.

The use of the worm —13— and pinion —8— for rolling the gear disks —7— along the rack —10— to and from a position across the ports —3— enables the valve disks to be automatically locked in any position of adjustment without a special close fitting of the gear teeth and enables the valve operating mechanism to be manufactured at a comparatively low cost, and at the same time increases the working efficiency of the operating parts.

While I have shown the hand wheel —15—, with spindle —11—, and worm —13—, operating the pinion —8—, thereby rotating the valve disc —7—, as the preferable construction, I do not want to be limited to this construction, as for certain uses where a quick opening valve might be required, I would prefer to extend one end of the pinion —8— thru the side of the valve case, and fit it with a suitable lever, so that the pinion —8—, and valve discs —7—, could be quickly rotated.

What I claim is:—

1. A valve comprising a case having a passage therethrough, a gear and a driving worm therefor, both journaled in the case at one side of said passage, a toothed rack secured to the interior of the case concentric with said gear and at the opposite side of the passage, and a circular valve controlling said passage and provided with peripheral teeth meshing with and actuated along said rack by the gear as the latter is rotated by the worm.

2. A valve comprising a case having a passage therethrough, a gear and a driving worm therefor, both journaled in the case at one side of said passage, a toothed rack secured to the interior of the case concentric with said gear and at the opposite side of the passage, and a circular valve controlling said passage and provided with peripheral teeth meshing with and actuated along said rack by the gear as the latter is rotated by the worm, said case having tracks at opposite sides of the toothed rack concentric with the gear, the valve having circular bearing faces at opposite sides of its peripheral teeth engaging said tracks to guide the valve in its rolling movement along the rack above the axis of said gear.

3. A valve comprising a case having a passage therethrough, a gear journaled in the case above the passage, means for rotating the gear, a toothed rack secured to the case and extending from a point below the passage concentric with said gear, and a circular valve controlling said passage and provided with peripheral teeth meshing with said rack and gear to cause the valve to roll along the rack about the axis of the gear as the latter is rotated.

In witness whereof I have hereunto set my hand this fifteenth day of July 1919.

WILLARD A. KITTS, Jr.

Witnesses:
 H. A. D'Arcy,
 B. V. Tiblin.